United States Patent
Chishima

(10) Patent No.: US 11,566,192 B2
(45) Date of Patent: Jan. 31, 2023

(54) FUEL PRODUCTION SYSTEM

(71) Applicant: HONDA MOTOR CO., LTD., Tokyo (JP)

(72) Inventor: Hiroshi Chishima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 17/204,941

(22) Filed: Mar. 18, 2021

(65) Prior Publication Data

US 2021/0292667 A1    Sep. 23, 2021

(30) Foreign Application Priority Data

Mar. 19, 2020 (JP) .............................. JP2020-048936

(51) Int. Cl.
| | |
|---|---|
| C10J 3/72 | (2006.01) |
| C25B 1/04 | (2021.01) |
| C25B 15/08 | (2006.01) |
| C10G 2/00 | (2006.01) |
| C25B 9/65 | (2021.01) |
| C25B 15/02 | (2021.01) |

(52) U.S. Cl.
CPC ................ *C10J 3/723* (2013.01); *C10G 2/30* (2013.01); *C25B 1/04* (2013.01); *C25B 9/65* (2021.01); *C25B 15/02* (2013.01); *C25B 15/081* (2021.01); *C10G 2300/1022* (2013.01); *C10G 2300/42* (2013.01); *C10J 2300/0916* (2013.01); *C10J 2300/1659* (2013.01); *C10J 2300/1684* (2013.01); *Y02E 50/10* (2013.01)

(58) Field of Classification Search
CPC ........ C10G 2300/42; C10G 2300/1022; C25B 9/65; C25B 15/02; C25B 15/081; C10J 2300/1684; C10J 2300/1659; C10J 2300/0916; C10J 2300/0966; C10J 2300/0959; C10J 3/723
See application file for complete search history.

(56) References Cited

U.S. PATENT DOCUMENTS

| | | |
|---|---|---|
| 2001/0054256 A1 | 12/2001 | Katayama |
| 2002/0087037 A1 | 7/2002 | Kaneko et al. |
| 2010/0076097 A1 | 3/2010 | Metz et al. |

(Continued)

FOREIGN PATENT DOCUMENTS

| | | |
|---|---|---|
| JP | 2001316681 A | 11/2001 |
| JP | 2002003864 A | 1/2002 |

(Continued)

*Primary Examiner* — Jafar F Parsa
(74) *Attorney, Agent, or Firm* — CKC & Partners Co., LLC

(57) ABSTRACT

A fuel production system 1 includes a gasification unit 3; an electrolysis unit 60 that is connected to a renewable power generating unit 5 and a commercial power grid 8 and produces hydrogen using electric power; and a control unit 7 that determines a power index that depending on the carbon dioxide emission intensity of the electric power supplied from the commercial power grid 8. When the remaining amount of hydrogen is smaller than a lower threshold, the control unit 7 causes electric power to be supplied to the electrolysis unit 60 from the renewable power generating unit 5 and the commercial power grid 8 for production of hydrogen, and controls, based on the power index, the amount of hydrogen supplied by a hydrogen supply pump 64 and the amount of commercial power supply from the commercial power grid 8 to the electrolysis unit 60.

12 Claims, 9 Drawing Sheets

(56) References Cited

U.S. PATENT DOCUMENTS

2011/0185634 A1    8/2011  Prestel
2021/0215095 A1    7/2021  Hirokane et al.

FOREIGN PATENT DOCUMENTS

| | | |
|---|---|---|
| JP | 2002012877 A | 1/2002 |
| JP | 2002193858 A | 7/2002 |
| WO | 2019151461 A1 | 8/2019 |

FUEL PRODUCTION SYSTEM

This application is based on and claims the benefit of priority from Japanese Patent Application No. 2020-048936, filed on 19 Mar. 2020, the content of which is incorporated herein by reference.

BACKGROUND OF THE INVENTION

Field of the Invention

The present invention relates to a fuel production system. More specifically, the present invention relates to a fuel production system that produces a liquid fuel using biomass feedstock and renewable energy.

Related Art

In recent years, synthetic fuels have attracted attention as alternatives to fossil fuels. Such synthetic fuels are produced from materials including: hydrogen produced using power generated using renewable energy; and a carbon source such as biomass or carbon dioxide discharged from factories.

A common process for producing a liquid fuel, such as methanol or gasoline, using biomass as feedstock is as follows. The process includes a gasification step including gasifying specifically pretreated biomass feedstock together with water and oxygen in a gasification furnace to produce a syngas containing hydrogen and carbon monoxide; a cleaning step including cleaning the produced syngas and removing tar; a $H_2/CO$ ratio adjusting step including adjusting the $H_2/CO$ ratio of the cleaned syngas to a target ratio depending on the liquid fuel to be produced; a desulfurization step including removing sulfur components from the syngas after the $H_2/CO$ ratio adjusting step; and a fuel production step including producing a liquid fuel from the syngas after the desulfurization step. The liquid fuel is produced from the biomass feedstock through the process.

In this process, the $H_2/CO$ ratio of the syngas produced through the gasification step often remains short of the target ratio, which means that the syngas is short of hydrogen. In the $H_2/CO$ ratio adjusting step, therefore, hydrogen is produced by reaction of carbon monoxide with water to increase the $H_2/CO$ ratio to the target ratio.

Patent Document 1 discloses an invention relating to a fuel production system that produces a synthetic fuel from biomass feedstock as mentioned above. In this system, hydrogen is produced using power generated using renewable energy and then mixed into a syngas, which is produced using a gasification furnace, to adjust the $H_2/CO$ ratio to a target ratio.

Patent Document 1: Japanese Unexamined Patent Application, Publication No. 2002-193858

SUMMARY OF THE INVENTION

The fuel production system disclosed in Patent Document 1 includes an electrolysis apparatus that produces hydrogen using electric power generated using renewable energy; and a hydrogen tank that stores the produced hydrogen. In the system disclosed in Patent Document 1, the amount of hydrogen remaining in the hydrogen tank will significantly fluctuate depending on the environmental conditions because wind power or sunlight supposed to be the renewable energy is not constant. If the remaining amount of hydrogen is close to the lower storage limit of the hydrogen tank, therefore, a sufficient amount of hydrogen can no longer be supplied to the gasification furnace and so on, which may lead to an increase in the amount of carbon dioxide emission in the gasification step, the $H_2/CO$ ratio adjusting step, and so on. This may result in a significant increase in the carbon dioxide emission intensity of the liquid fuel produced by the fuel production system (the carbon dioxide emission intensity is the amount of carbon dioxide emitted during the production of a unit amount of the liquid fuel, also called "carbon intensity").

It is an object of the present invention to provide a fuel production system capable of continuously producing a liquid fuel with no significant increase in the carbon dioxide emission intensity of the liquid fuel even when only a small amount of hydrogen remains in its hydrogen tank.

(1) A fuel production system (e.g., a fuel production system 1 described later) according to the present invention is for producing a liquid fuel from biomass feedstock and includes a gasification unit (e.g., a gasification unit 3 described later) including a gasification furnace (e.g., a gasification furnace 30 described later) that gasifies biomass feedstock to produce a syngas including hydrogen and carbon monoxide; a liquid fuel production unit (e.g., a liquid fuel production unit 4 described later) that produces a liquid fuel from the syngas produced by the gasification unit; an electrolysis unit (e.g., an electrolysis unit 60 described later) that is connected to a first electric power source (e.g., a renewable power generating unit 5 described later) that supplies electric power generated using renewable energy and connected to a second electric power source (e.g., a commercial power grid 8 described later) that supplies electric power with a carbon dioxide emission intensity higher than that of the electric power from the first electric power source and produces hydrogen from water using electric power; a hydrogen tank (e.g., a hydrogen tank 62 described later) that stores the hydrogen produced by the electrolyte unit; a remaining hydrogen amount determining section (e.g., a pressure sensor 63 and a control unit 7 described later) that determines the amount of hydrogen remaining in the hydrogen tank; a hydrogen supply unit (e.g., a hydrogen supply pump 64 described later) that supplies the hydrogen from the hydrogen tank to the gasification unit; a power index determining section (e.g., a control unit 7 described later) that determines a power index that increases and decreases depending on the carbon dioxide emission intensity of the electric power supplied from the second electric power source; and a control unit (e.g., a control unit 7 described later), in which when the remaining amount of hydrogen is smaller than a predetermined amount, the control unit causes the electric power to be supplied from the first and second electric power sources to the electrolysis unit for production of hydrogen and controls, based on the power index, the amount of hydrogen supplied by the hydrogen supply unit and the amount of second electric power supplied from the second electric power source to the electrolysis unit.

(2) In the system, the control unit preferably reduces the amount of hydrogen supply and the amount of second electric power supply as the power index increases and preferably increases the amount of hydrogen supply and the amount of second electric power supply as the power index decreases.

(3) In the system, the control unit preferably controls the amount of hydrogen supply and the amount of second electric power supply such that the liquid fuel produced by the liquid fuel production unit has a minimum carbon dioxide emission intensity.

(4) In the system, the control unit preferably causes the electrolysis unit to supply, to the gasification unit, hydrogen produced using the electric power supplied from the second electric power source and preferably controls the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from a power generating system (e.g., a commercial power generating system 8a described later) that supplies the electric power to the second electric power source, per unit of liquid fuel produced by the liquid fuel production unit.

(5) In the system, the power index determining section preferably acquires information indicating the composition of the energy mix of the power generating system and preferably calculates the power index based on the information indicating the composition of the energy mix.

(1) The fuel production system according to the present invention includes a gasification unit that gasifies biomass feedstock to produce a syngas; a liquid fuel production unit that produces a liquid fuel from the syngas; an electrolysis unit that produces hydrogen using electric power; a hydrogen tank that stores the hydrogen produced by the electrolysis unit; and a hydrogen supply unit that supplies the hydrogen from the hydrogen tank to the gasification unit. In the present invention, the electrolysis unit is connected to two electric power sources including first and second electric power sources, in which the first electric power source supplies electric, power generated using renewable energy, and the second electric power source supplies electric power with a carbon dioxide emission intensity higher than that of the electric power from the first electric power source. When the amount of hydrogen remaining in the hydrogen tank is smaller than a predetermined amount, the control unit causes electric power to be supplied to the electrolysis unit not only from the first electric power source using renewable energy but also from the second electric power source. This allows the electrolysis unit to produce as much hydrogen as necessary for the gasification unit. The power index determining section determines a power index that increases and decreases depending on the carbon dioxide emission intensity of the electric power supplied from the second electric power source. When the amount of hydrogen remaining in the hydrogen tank is smaller than a predetermined amount, the control unit controls, based on the power index, the amount of hydrogen supplied by the hydrogen supply unit and the amount of second electric power supplied from the second electric power source to the electrolysis unit. This makes possible continuous production of the liquid fuel with no significant increase in the carbon dioxide emission intensity of the liquid fuel even when the amount of hydrogen remaining in the hydrogen tank is smaller than a predetermined amount.

(2) The higher the power index, the larger the amount of carbon dioxide emitted from the power generating system that supplies electric power to the second electric power source, per unit of hydrogen produced by the electrolysis unit using electric power supplied from the second electric power source. In the present invention, therefore, the control unit may reduce the amount of hydrogen supply and the amount of second electric power supply as the power index increases, and may increase the amount of hydrogen supply and the amount of second electric power supply as the power index decreases. This makes possible continuous production of the liquid fuel with no significant increase in the carbon dioxide emission intensity of the liquid fuel.

(3) The liquid fuel is produced using the gasification unit and the liquid fuel production unit while the hydrogen produced using electric power supplied from the second electric power source is supplied to the gasification unit. In this process, main carbon dioxide emission sources are the gasification unit and the power generating system that supplies electric power to the second electric power source. The amount of carbon dioxide emitted in the gasification unit correlates with the amount of hydrogen supplied to the gasification unit. Therefore, the carbon dioxide emission intensity of the liquid fuel correlates with the amount of hydrogen supply and the amount of second electric power supply. Based on the correlation, the control unit controls the amount of hydrogen supply and the amount of second electric power supply so as to minimize the carbon dioxide emission intensity of the liquid fuel. This makes possible continuous production of the liquid fuel with no significant increase in the carbon dioxide emission intensity of the liquid fuel, even when the remaining amount of hydrogen is smaller than a predetermined amount.

(4) In the present invention, the control unit may cause the electrolysis unit to supply, to the gasification unit, hydrogen produced using the electric power supplied from the second electric power source and may control the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from the power generating system that supplies the electric power to the second electric power source, per unit of liquid fuel produced by the liquid fuel production unit. This feature makes possible continuous production of the liquid fuel with no significant increase in the carbon dioxide emission intensity of the liquid fuel, even when the remaining amount of hydrogen is smaller than a predetermined amount.

(5) In the present invention, the power index determining section may acquire information indicating the composition of the energy mix of the power generating system that supplies electric power to the second electric power source and may calculate the power index based on the information indicating the composition of the energy mix. This allows precise calculation of the power index based on the composition of the energy mix of the power generating system, which changes with time.

DETAILED DESCRIPTION OF THE INVENTION

Hereinafter, a fuel production system 1 according to an embodiment of the present invention will be described with reference to the drawings.

Figure 1:
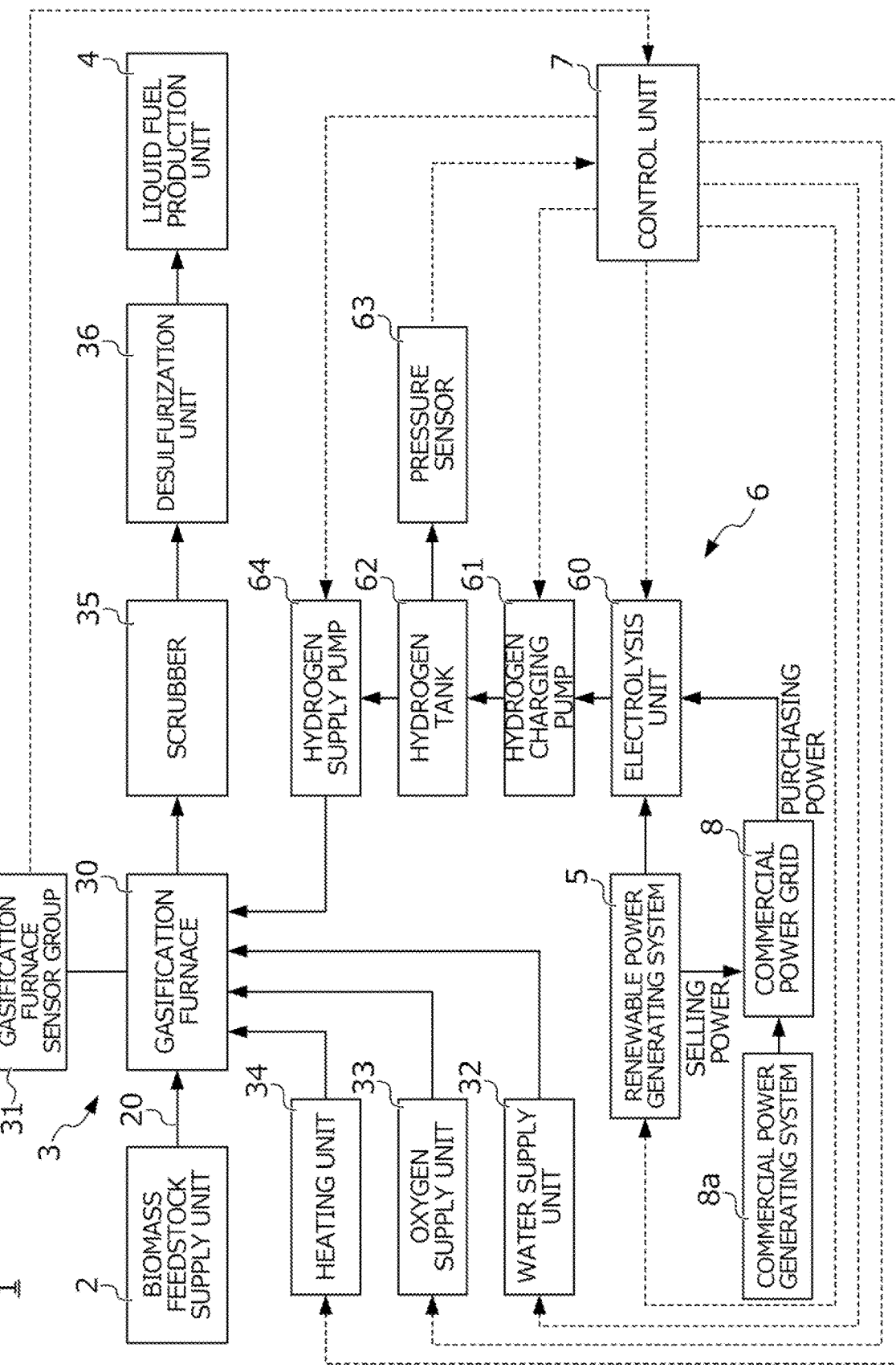
FIG. 1 is a diagram showing the configuration of a fuel production system according to an embodiment of the present invention.

FIG. 1 is a diagram showing the configuration of the fuel production system 1 according to an embodiment of the present invention. The fuel production system 1 includes a biomass feedstock supply unit 2 that supplies biomass feedstock; a gasification unit 3 that gasifies biomass feedstock supplied from the biomass feedstock supply unit 2 to produce a syngas including hydrogen and carbon monoxide; a liquid fuel production unit 4 that produces a liquid fuel from the syngas supplied from the gasification unit 3; a renewable power generating unit 5 that generates electric power using renewable energy; a hydrogen production and supply unit 6 that produces hydrogen from water using electric power supplied from the renewable power generating unit 5 and/or a commercial power grid 8 and supplies the produced hydrogen to the gasification unit 3; and a control unit 7 that controls the gasification unit 3, the renewable power generating unit 5, and the hydrogen production and supply unit 6. The system 1 uses these components to produce a liquid fuel from biomass feedstock.

The biomass feedstock supply unit 2 pretreats, in a given way, biomass feedstock, such as rice hulls, bagasse, and wood, and supplies the pretreated biomass feedstock to a gasification furnace 30 in the gasification unit 3 through a feedstock supply channel 20. The pretreatment performed on the biomass feedstock includes, for example, a drying step including drying the feedstock and a pulverization step including pulverizing the feedstock.

The gasification unit 3 includes a gasification furnace 30 that gasifies the biomass feedstock supplied through the feedstock supply channel 20; a group 31 of gasification furnace sensors including multiple sensors that each detect the condition of the interior of the gasification furnace 30; a water supply unit 32 that supplies water into the gasification furnace 30; an oxygen supply unit 33 that supplies oxygen into the gasification furnace 30; a heating unit 34 that heats the gasification furnace 30; a scrubber 35 that cleans the syngas discharged from the gasification furnace 30; and a desulfurization unit 36 that removes sulfur components from the syngas cleaned by the scrubber 35 and supplies the desulfurized syngas to the liquid fuel production unit 4.

The water supply unit 32 supplies water from a water tank (not shown), which stores water, into the gasification furnace 30. The oxygen supply unit 33 supplies oxygen from an oxygen tank (not shown), which stores oxygen, into the gasification furnace 30. The heating unit 34 heats the gasification furnace 30 by consuming a fuel supplied from a fuel tank (not shown) or consuming electric power supplied from a power source (not shown). The control unit 7 controls the amount of water supplied from the water supply unit 32 into the gasification furnace 30, the amount of oxygen supplied from the oxygen supply unit 33 into the gasification furnace 30, and the amount of heat introduced from the heating unit 34 into the gasification furnace 30. In the fuel production system 1 according to this embodiment, the supply of hydrogen from the hydrogen production and supply unit 6 into the gasification furnace 30 or the feedstock supply channel 20 will sometimes eliminate the need to actively supply water from the water supply unit 32 into the gasification furnace 30. In this case, the water supply unit 32 may be omitted from the fuel production system 1.

When the water supply unit 32, the oxygen supply unit 33, and the heating unit 34 introduce water, oxygen, and heat, respectively, into the gasification furnace 30 containing the supplied biomass feedstock, forward gasification reactions and backward reactions, such as those represented by formulas (1-1) to (1-5) (ten reactions in total), are allowed to proceed in the gasification furnace 30 so that a syngas including hydrogen and carbon monoxide is produced.

$$C+H_2O \leftrightarrows CO+H_2 \quad (1\text{-}1)$$

$$C+CO_2 \leftrightarrows 2CO \quad (1\text{-}2)$$

$$C+2H_2 \leftrightarrows CH_4 \quad (1\text{-}3)$$

$$CO+H_2O \leftrightarrows CO_2+H_2 \quad (1\text{-}4)$$

$$CH_4+H_2O \leftrightarrows CO+3H_2 \quad (1\text{-}5)$$

The gasification furnace sensor group 31 includes, for example, a pressure sensor for detecting the pressure in the gasification furnace 30, a temperature sensor for detecting the temperature in the gasification furnace 30, a $H_2/CO$ sensor for detecting the $H_2/CO$ ratio corresponding to the ratio between hydrogen and carbon monoxide in the syngas in the gasification furnace 30, a $CO_2$ sensor for detecting carbon dioxide in the gasification furnace 30, and the like. The sensors in the gasification furnace sensor group 31 send sensor signals to the control unit 7.

The gasification furnace 3 mixes the syngas produced by the gasification reactions and reverse reactions thereof represented by formulas (1-1) to (1-5) above with hydrogen supplied from the hydrogen production and supply unit 6 described later to adjust the $H_2/CO$ ratio of the syngas to a predetermined target ratio (e.g., a target $H_2/CO$ ratio of 2 when methanol is produced) depending on the liquid fuel to be produced, and then supplies the resulting syngas to the liquid fuel production unit 4.

The liquid fuel production unit 4 may include a methanol synthesis unit, a methanol-to-gasoline (MTG) synthesis unit, a Fischer-Tropsch (FT) synthesis unit, and an upgrading unit, or the like and use these units to produce a liquid fuel, such as methanol or gasoline, from the syngas with the $H_2/CO$ ratio adjusted to a predetermined ratio in the gasification unit 3.

The renewable power generating unit 5 may include a wind power generating unit configured to generate electricity by wind power as renewable energy, a solar power generating unit configured to generate electricity from sunlight as renewable energy, or the like. The renewable power generating unit 5 is connected to the hydrogen production and supply unit 6 so that the power generated by the wind power generating unit, the solar power generating unit, or the like using renewable energy is supplied to the hydrogen production and supply unit 6. The renewable power generating unit 5 is also connected to a commercial power grid 8. Thus, some or all of the power generated by the renewable power generating unit 5 can be supplied to the commercial power grid 8 for the purpose of selling the power to a power company.

The commercial power grid 8 receives the power generated through a commercial power generating system 8a operated by the power company. The commercial power grid 8 is connected to the hydrogen production and supply unit 6. Thus, the power through the commercial power grid 8 can be purchased from the power company and supplied to the hydrogen production and supply unit 6. The commercial power generating system 8a includes multiple power generating plants operated by the power company, such as a thermal power plant, a hydroelectric power plant, a nuclear power plant, a wind power plant, a solar power plant, and a geothermal power plant.

The power generated through the commercial power generating system 8a has a carbon dioxide emission intensity higher than that of the power generated by the renewable power generating unit 5 using renewable energy. The information indicating the composition of the energy mix of the commercial power generating system 8a is transmitted from the power company to the control unit 7, as needed. The information indicating the composition of the energy mix includes pieces of information necessary for the calculation of the carbon dioxide emission intensity of the power through the commercial power grid 8. More specifically, the information indicating the composition of the energy mix includes pieces of information indicating the composition ratio between the materials or energy sources used for the power generation through the commercial power generating system 8a (specifically, composition percentages such as a % of coal, b % of petroleum, c % of gas, and d % of renewable energy).

The hydrogen production and supply unit 6 includes an electrolysis unit 60, a hydrogen charging pump 61, a hydrogen tank 62, a pressure sensor 63, and a hydrogen supply pump 64 and uses these components to produce hydrogen using the power supplied from the renewable power generating unit 5 and the commercial power grid 8 and then to supply the produced hydrogen to the gasification unit 3.

The electrolysis unit 60, which is connected to the renewable power generating unit 5, produces hydrogen from water by electrolysis using the power supplied from the renewable power generating unit 5. The electrolysis unit 60 is also connected to the commercial power grid 8. Thus, the electrolysis unit 60 can produce hydrogen using either or both of the power supplied from the renewable power generating unit 5 and the power supplied through the commercial power grid 8, which is purchased from the power company. The amount of power supplied from the commercial power grid 8 to the electrolysis unit 60 (hereinafter referred to as "the amount of commercial power supply") and the amount of hydrogen produced by the electrolysis unit 60 are controlled by the control unit 7.

The hydrogen charging pump 61 compresses the hydrogen produced by the electrolysis unit 60 and charges the hydrogen into the hydrogen tank 62. The amount of hydrogen charged by the hydrogen charging pump 61 is controlled by the control unit 7. The hydrogen tank 62 stores the hydrogen compressed by the hydrogen charging pump 61. The pressure sensor 63 detects the pressure in the hydrogen tank 62 and sends a sensor signal to the control unit 7. The amount of hydrogen remaining in the hydrogen tank 62 is calculated by the control unit 7 based on the sensor signal from the pressure sensor 63. In this embodiment, therefore, the remaining hydrogen amount determining section that determines the amount of hydrogen remaining in the hydrogen tank 62 includes the pressure sensor 63 and the control unit 7.

The hydrogen supply pump 64 supplies the hydrogen from the hydrogen tank 62 into the gasification furnace 30 of the gasification unit 3. The amount of hydrogen supplied from the hydrogen supply pump 64 into the gasification furnace 30 is controlled by the control unit 7. FIG. 1 illustrates an embodiment in which the hydrogen is stored in the hydrogen tank 62 and then supplied into the gasification furnace 30 by the hydrogen supply pump 64, which is not intended to limit the present invention. Alternatively, after being stored in the hydrogen tank 62, the hydrogen may be supplied upstream of the gasification furnace 30, more specifically, supplied into the biomass feedstock supply channel 20.

The control unit 7 is a computer that controls the amount of water supplied by the water supply unit 32, the amount of oxygen supplied by the oxygen supply unit 33, the amount of heat introduced by the heating unit 34, the amount of hydrogen produced by the electrolysis unit 60, the amount of hydrogen charged by the hydrogen charging pump 61, the amount of hydrogen supplied by the hydrogen supply pump 64, and so on based on sensor signals from the gasification furnace sensor group 31, the pressure sensor 63 of the hydrogen tank 62, and so on. How the control unit 7 specifically controls the amount of hydrogen supply and the like will be described later with reference to FIGS. 4 to 11.

Next, how the supply of hydrogen into the gasification furnace 30 or the feedstock supply channel 20 in the gasification unit 3 is advantageously effective will be described with reference to FIGS. 2 and 3.

Figure 2:
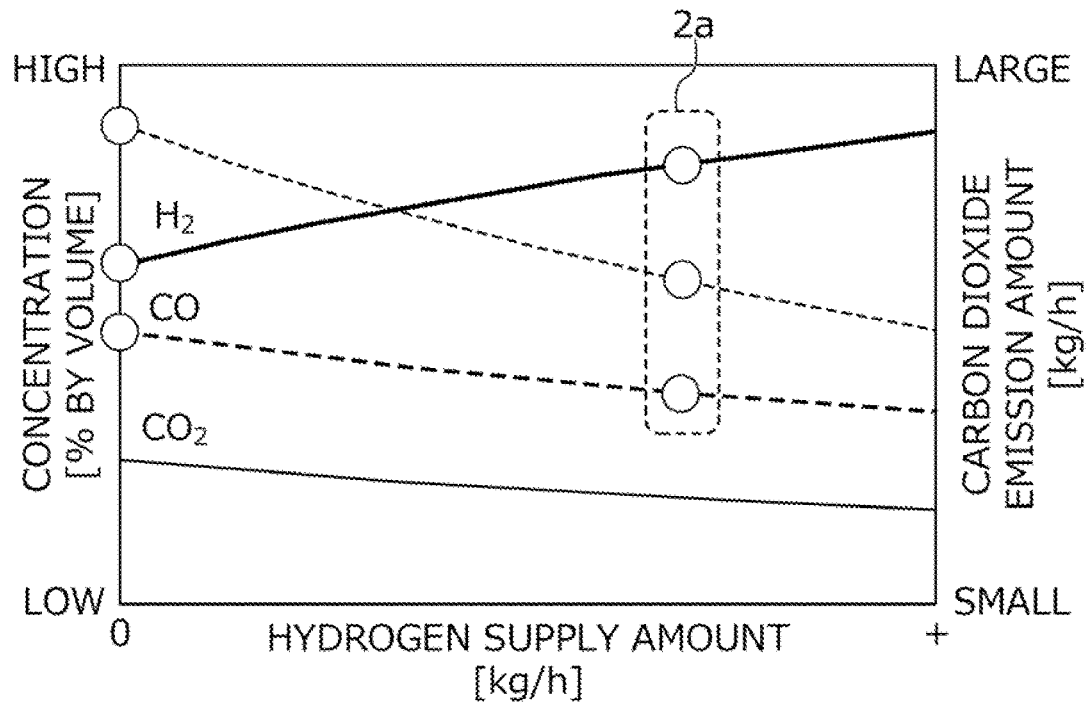
FIG. 2 is a graph showing the relationship between the concentration of each component in the syngas in the gasification furnace and the amount of hydrogen supplied into the gasification furnace.

FIG. 2 is a graph showing the relationship between the concentration (% by volume) of each component in the syngas in the gasification furnace 30 and the rate (kg/h) of hydrogen supply into the gasification furnace 30. FIG. 2 shows the results of simulation under specific conditions. In FIG. 2, the thick solid line indicates the hydrogen concentration of the syngas in the gasification furnace 30, the thick dashed line indicates the carbon monoxide concentration of the syngas in the gasification furnace 30, and the thin solid line indicates the carbon dioxide concentration of the syngas in the gasification furnace 30. FIG. 2 also shows the amount (kg/h) of carbon dioxide production throughout the system, which is indicated by the thin dashed line, in a case where a syngas with a predetermined target ratio is produced at a predetermined rate by the gasification unit 3.

Figure 3:
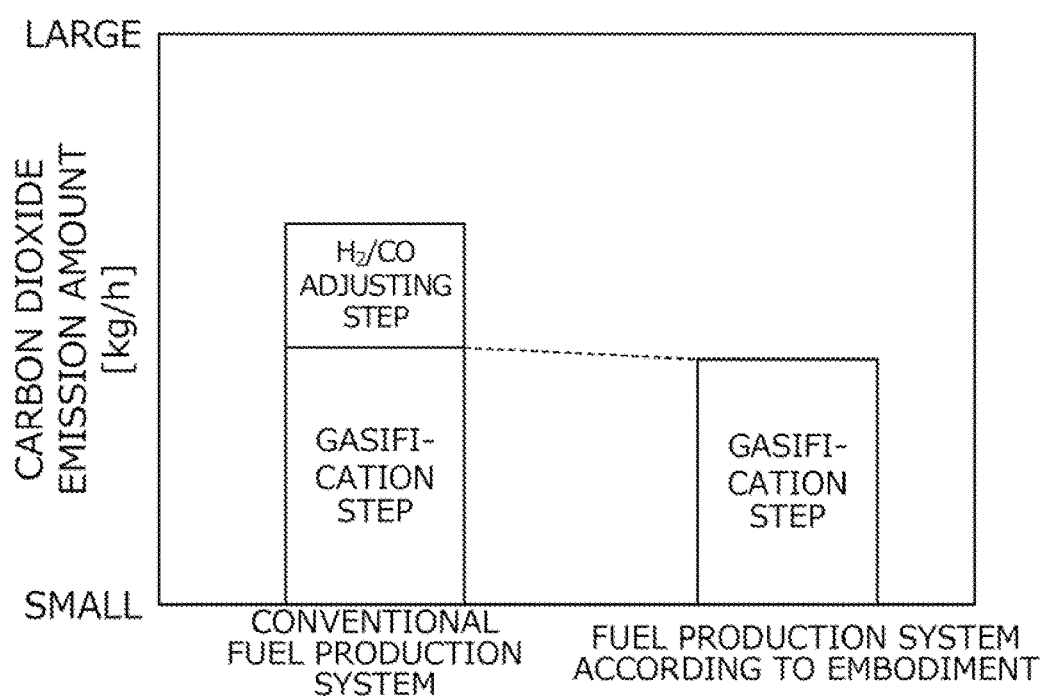
FIG. 3 is a graph showing a comparison between the conventional fuel production system and a fuel production system according to an embodiment of the present invention with respect to the total amount and breakdown amount of carbon dioxide emitted throughout the system when a predetermined amount of syngas with a predetermined target ratio is produced.

FIG. 3 is a graph showing a comparison between the conventional fuel production system and the fuel production system 1 according to this embodiment with respect to the total amount (kg/h) and breakdown amount (kg/h) of carbon dioxide emitted throughout the system when a syngas with a predetermined target ratio is produced at a predetermined rate. In this regard, the conventional fuel production system is configured to adjust, using water, the $H_2/CO$ ratio of the syngas produced by the gasification unit 3 to a target ratio without supplying hydrogen from outside to the gasification unit 3.

As shown in FIG. 2, if the amount of hydrogen supplied into the gasification furnace 30 is set at zero, the $H_2/CO$ ratio of the syngas in the gasification furnace 30 will be smaller than the target ratio. To increase the $H_2/CO$ ratio of the syngas produced by the gasification unit 3 to the target ratio, therefore, it is necessary to further perform a $H_2/CO$ ratio adjusting step that includes allowing water to react with excess of carbon monoxide in the syngas produced in the gasification furnace 30 to increase the $H_2/CO$ ratio. Unfortunately, such a $H_2/CO$ ratio adjusting step causes carbon dioxide emission. In the conventional fuel production system, therefore, carbon dioxide is emitted not only in the gasification step in the gasification furnace 30 but also in the $H_2/CO$ ratio adjusting step as shown in FIG. 3.

To address this, as indicated by the dashed line 2a in FIG. 2, the amount of hydrogen supplied into the gasification furnace 30 is increased, so that the concentration of hydrogen in the syngas in the gasification furnace 30 increases correspondingly. Thus, when the amount of hydrogen supplied into the gasification furnace 30 is controlled to a predetermined amount, the $H_2/CO$ ratio of the syngas in the gasification furnace 30 is successfully adjusted to the target ratio. In the fuel production system 1 according to this embodiment, therefore, it is not necessary to actively perform a $H_2/CO$ ratio adjusting step, so that the amount of carbon dioxide can be made smaller by at least an amount corresponding to no need for such a step than that in the conventional fuel production system.

Moreover, when the amount of hydrogen supplied into the gasification furnace 30 is increased, the amount of water supplied into the gasification furnace 30 can be made smaller than that in the conventional fuel production system, which results in suppression of the reactions for producing carbon monoxide and carbon dioxide among the reactions represented by formulas (1-1) to (1-5) occurring in the gasification furnace 30. That is, as shown in FIG. 2, as the amount of hydrogen supplied into the gasification furnace 30 is increased, the concentration of carbon monoxide and carbon dioxide in the syngas in the gasification furnace 30 decreases. As shown in FIG. 3, therefore, the amount of carbon dioxide emitted in the gasification step in the gasification furnace 30 can be made smaller in the fuel production system 1 according to this embodiment than in the conventional fuel production system. The above demonstrates that the total emission of carbon dioxide can be reduced throughout the fuel production system 1 according to this embodiment.

Figure 4:
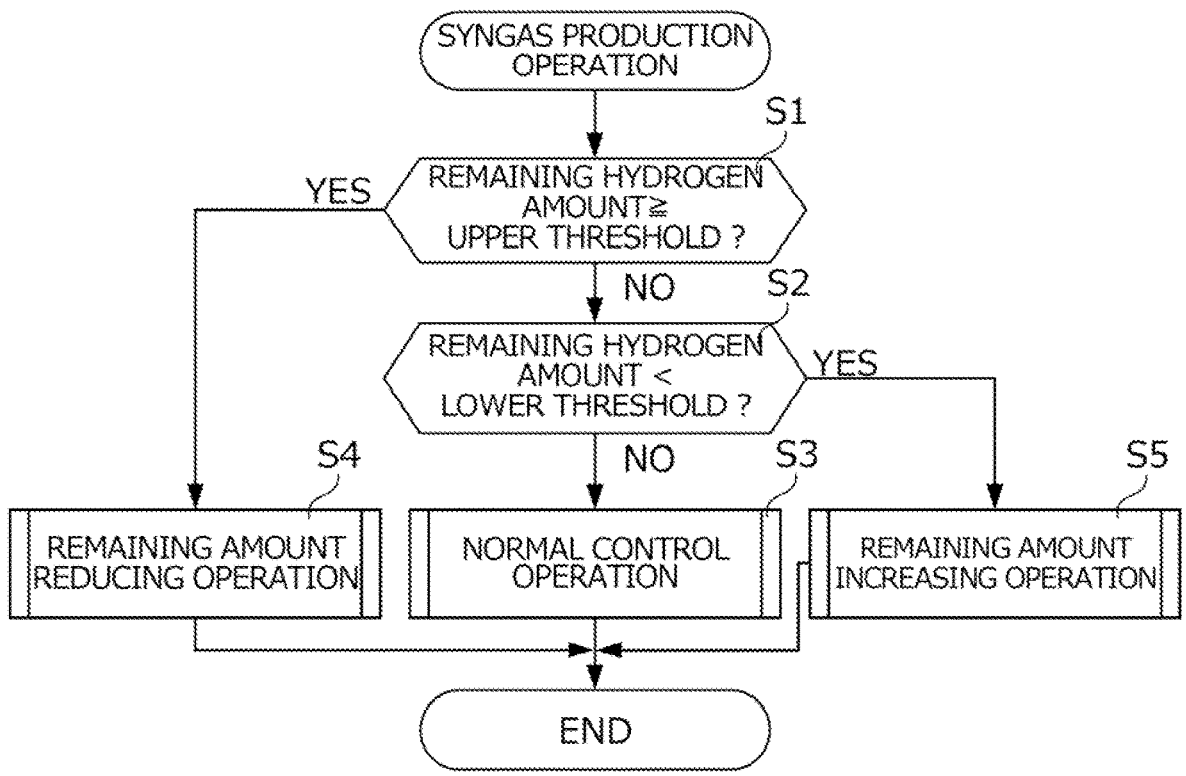
FIG. 4 is a main flowchart of a syngas production operation.

FIG. 4 is a main flowchart of a syngas production operation using the gasification unit 3, the hydrogen production and supply unit 6, and the renewable power generating unit 5. The syngas production operation shown in FIG. 4 is repeatedly performed with a predetermined period by the control unit 7.

Figure 5:
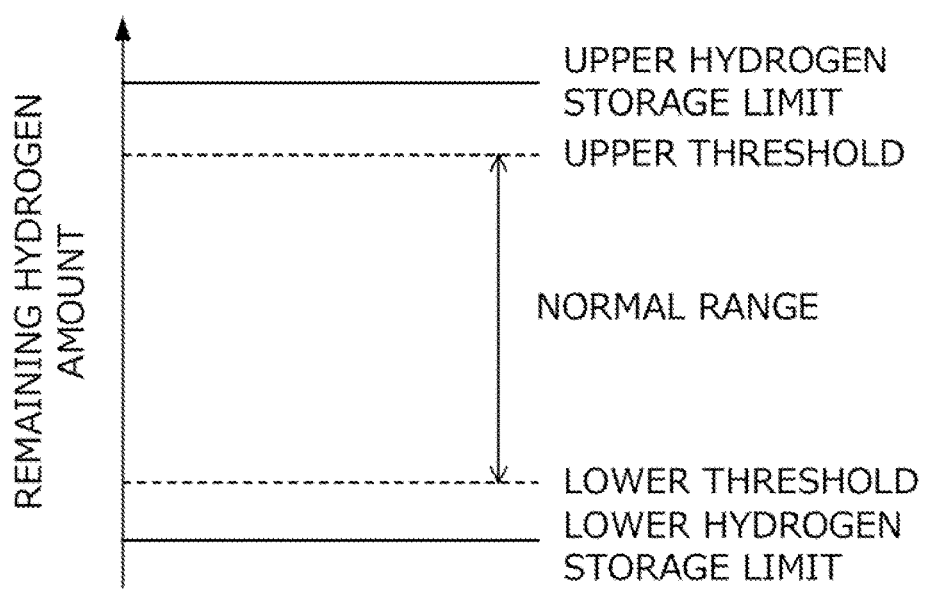
FIG. 5 is a diagram showing threshold values set for the amount of hydrogen remaining in a hydrogen tank.

FIG. 5 is a diagram showing threshold values set for the amount of hydrogen remaining in the hydrogen tank 62, which is for illustrating the concept of the syngas production operation shown in FIG. 4. In FIG. 5, the upper hydrogen storage limit corresponds to the upper limit of the amount of hydrogen storable in the hydrogen tank 62. That is, the hydrogen tank 62 cannot store hydrogen in an amount more than the upper hydrogen storage limit. In FIG. 5, the lower hydrogen storage limit corresponds to the minimum amount of hydrogen that needs to be stored in the hydrogen tank 62 for the supply of hydrogen from the hydrogen tank 62 into the gasification furnace 30 through the hydrogen supply pump 64. Therefore, if the remaining amount of hydrogen falls below the lower hydrogen storage limit, the hydrogen supply pump 64 can no longer supply hydrogen into the gasification furnace 30.

In the syngas production operation, upper and lower thresholds are set with respect to the remaining amount of hydrogen. The upper threshold is set slightly smaller than the upper hydrogen storage limit, and the lower threshold is set smaller than the upper threshold and slightly larger than the lower hydrogen storage limit. In the operation, the gasification unit 3, the hydrogen production and supply unit 6, and the renewable power generating unit 5 are controlled such that the amount of hydrogen remaining in the hydrogen tank 62 is maintained within a normal range between the upper and lower thresholds, in other words, such that the remaining amount of hydrogen will neither depart from the normal range nor reach the upper or lower hydrogen storage limit.

First, in step S1, the control unit 7 calculates the amount of hydrogen remaining in the hydrogen tank 62 based on the sensor signal from the pressure sensor 63 and then determines whether the remaining amount of hydrogen is equal to or more than the upper threshold. When the result of determination in step S1 is NO, the control unit 7 proceeds to step S2. In step S2, the control unit 7 determines whether the amount of hydrogen remaining in the hydrogen tank 62 is less than the lower threshold.

When the result of determination in step S2 is NO, that is, when the amount of hydrogen remaining in the hydrogen tank 62 is within the normal range, the control unit 7 performs a normal control operation (see step S3), which will be described later with reference to FIG. 6, and then ends the operation shown in FIG. 4. As shown in FIG. 5, the remaining amount of hydrogen falling within the normal range may mean that the hydrogen tank 62 has room to receive hydrogen produced by the electrolysis unit 60 and has room to supply hydrogen in an amount necessary for the gasification furnace 30.

When the result of determination in step S1 is YES, that is, when the amount of hydrogen remaining in the hydrogen tank 62 is equal to or more than the upper threshold, the control unit 7 performs a remaining amount reducing operation (see step S4), which will be described later with reference to FIG. 7, and then ends the operation shown in FIG. 4. As shown in FIG. 5, when the remaining amount of hydrogen is equal to or more than the upper threshold, it is necessary to reduce the remaining amount of hydrogen so that the remaining amount will not exceed the upper hydrogen storage limit. As mentioned above, if the remaining amount of hydrogen exceeds the upper hydrogen storage limit, the hydrogen tank 62 can no longer store hydrogen, so that hydrogen can be no longer produced using renewable energy. Therefore, the control unit 7 performs the remaining amount reducing operation to reduce the remaining amount of hydrogen.

When the result of determination in step S2 is YES, that is, when the amount of hydrogen remaining in the hydrogen tank 62 is less than the lower threshold, the control unit 7 performs a remaining amount increasing operation (see step S5), which will be described later with reference to FIG. 9, and then ends the operation shown in FIG. 4. As shown in FIG. 5, when the remaining amount of hydrogen is less than the lower threshold, it is necessary to increase the remaining amount of hydrogen so that the remaining amount will not fall below the lower hydrogen storage limit. As mentioned above, if the remaining amount of hydrogen falls below the lower hydrogen storage limit, the hydrogen supply pump 64 can no long supply hydrogen. Therefore, the control unit 7 performs the remaining amount increasing operation to increase the remaining amount of hydrogen.

As described above, the syngas production operation shown in FIG. 4 includes performing the remaining amount reducing operation when the remaining amount of hydrogen is equal to or more than the upper threshold; performing the remaining amount increasing operation when the remaining amount of hydrogen is less than the lower threshold; and performing the normal control operation when the remaining amount of hydrogen falls within the normal range, so that the remaining amount of hydrogen is maintained within the normal range.

Figure 6:
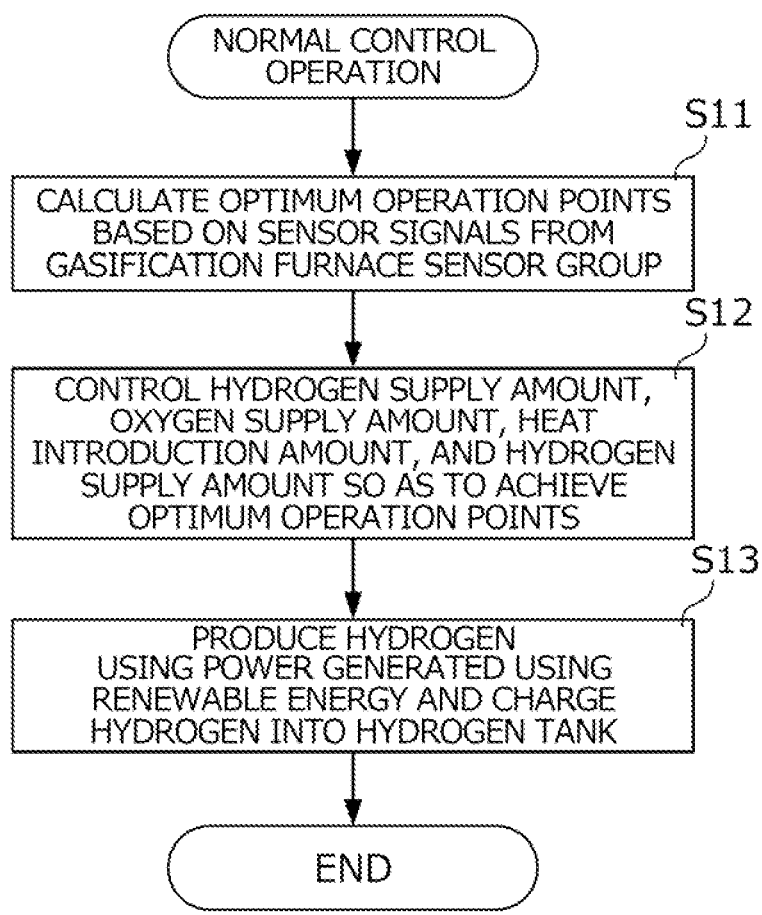
FIG. 6 is a flowchart showing a specific procedure for a normal control operation.

FIG. 6 is a flowchart showing a specific procedure for the normal control operation. First, in step S11, the control unit 7 calculates optimum points for operation of the gasification furnace 30 based on the sensor signals from the gasification furnace sensor group 31. In this case, optimum points for operation of the gasification furnace 30 include the amount of water supplied by the water supply unit 32, the amount of oxygen supplied by the oxygen supply unit 33, the amount of heat introduced by the heating unit 34, and the amount of hydrogen supplied by the hydrogen supply pump 64. Optimum operation points also refer to operation points at which the $H_2/CO$ ratio of the syngas discharged from the gasification furnace 30 reaches a target ratio. The control unit 7 stores a basic map that associates sensor signals from the gasification furnace sensor group 31 with optimum operation points. The control unit 7 calculates optimum operation points through retrieving data from the basic map based on the sensor signals from the gasification furnace sensor group 31.

The optimum points for operation of the gasification furnace 30 vary depending on the type and properties of the biomass feedstock introduced into the gasification furnace 30. Preferably, therefore, the control unit 7 stores basic maps different for each type and property of biomass feedstock, and calculates optimum operation points through selecting the basic maps for reference depending on the type and properties of the biomass feedstock introduced into the gasification furnace 30. Therefore, depending on the type and properties of the biomass feedstock introduced into the gasification furnace 30, the control unit 7 successfully changes the amount of hydrogen supplied by the hydrogen supply pump 64 and so on and adjusts, to a target ratio, the $H_2/CO$ ratio of the syngas discharged from the gasification furnace 30.

The above embodiment shows a case in which optimum operation points are calculated based on a basic map, which is not intended to limit the present invention. Alternatively, optimum operation points may be calculated through a calculation procedure preset based on sensor signals from the gasification furnace sensor group 31 and the type and properties of the biomass feedstock to be introduced into the gasification furnace 30.

In step S12, to achieve optimum operation points through the calculation, the control unit 7 controls the amount of water supplied by the water supply unit 32, the amount of oxygen supplied by the oxygen supply unit 33, the amount of heat introduced by the heating unit 34, and the amount of hydrogen supplied by the hydrogen supply pump 64.

In step S13, the control unit 7 causes the renewable power generating unit 5 to supply the power generated using renewable energy to the electrolysis unit 60, causes the electrolysis unit 60 to produce hydrogen, and causes the hydrogen charging pump 61 to charge the produced hydrogen into the hydrogen tank 62, and then ends the normal control operation shown in FIG. 6.

To maintain the amount of hydrogen remaining in the hydrogen tank 62 within the normal range without large fluctuations, the control unit 7 preferably control the amount of power supplied from the renewable power generating unit 5 to the electrolysis unit 60 or the amount of power generated by the renewable power generating unit 5 such that the amount of hydrogen produced by the electrolysis unit 60 and charged into the hydrogen tank 62 is equal to the amount of hydrogen supplied by the hydrogen supply pump 64, which is calculated in step S11. In some cases, however, the renewable power generating unit 5, which uses renewable energy to generate power, fails to supply the required amount of power to the electrolysis unit 60. In such cases, the remaining amount of hydrogen tends to decrease, since the amount of hydrogen supply becomes larger than the amount of hydrogen production and hydrogen charge. When the remaining amount of hydrogen is sufficiently smaller than the upper threshold, hydrogen may be produced using the entire amount of power generated by the renewable power generating unit 5 and charged into the hydrogen tank 62. In this case, the remaining amount of hydrogen tends to increase, since the amount of hydrogen production and hydrogen charge is larger than the amount of hydrogen supply. This allows the entire amount of available renewable energy to be converted into hydrogen for storage in the hydrogen tank 62.

Figure 7:
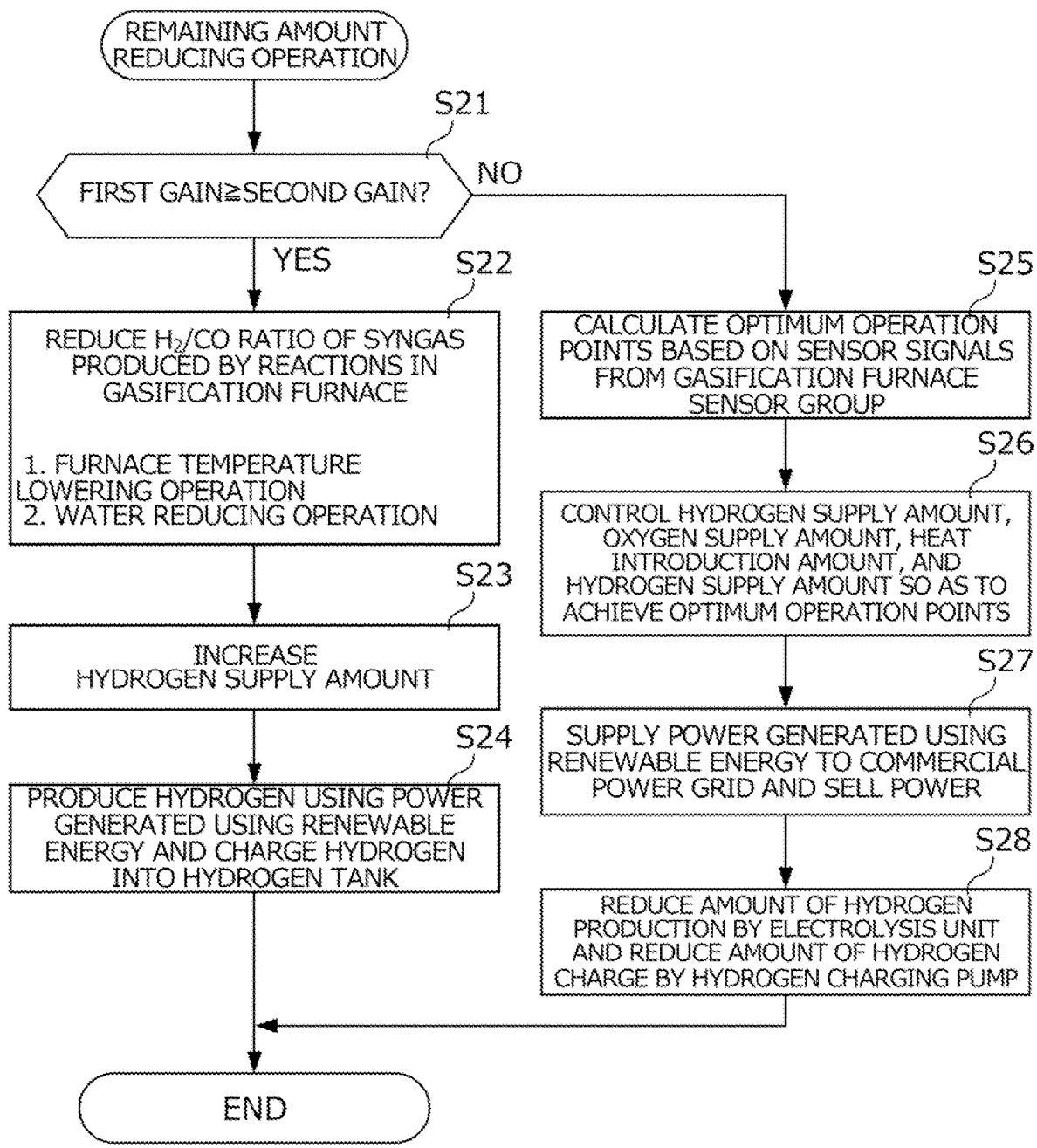
FIG. 7 is a flowchart showing a specific procedure for a remaining amount reducing operation.

FIG. 7 is a flowchart showing a specific procedure for the remaining amount reducing operation to reduce the amount of hydrogen remaining in the hydrogen tank 62. In the fuel production system 1, the hydrogen is supplied from the hydrogen tank 62 to the gasification unit 3 while the hydrogen produced by the electrolysis unit 60 is charged into the hydrogen tank 62. Therefore, to reduce the remaining amount of hydrogen, the control unit 7 is configured to select and perform one of a hydrogen consumption increasing control (steps S22 to 524) to reduce the remaining amount of hydrogen by increasing the consumption of hydrogen in the gasification unit 3 and the amount of hydrogen supplied by the hydrogen supply pump 64; and a hydrogen production reducing control (steps S25 to S28) to reduce the remaining amount of hydrogen by reducing the amount of hydrogen produced by the electrolysis unit 60 and the amount of hydrogen charged by the hydrogen charging pump 61.

First, in step S21, the control unit 7 calculates a first gain available if the hydrogen consumption increasing control is performed; and a second gain available if the hydrogen production reducing control is performed, and then determines whether the first gain is equal to or more than the second gain. When the result of determination in step S21 is YES, that is, when the hydrogen consumption increasing control is more advantageous than the hydrogen production reducing control, the control unit 7 proceeds to step S22. When the result of determination in S21 is NO, that is, when the hydrogen production reducing control is more advantageous than the hydrogen consumption increasing control, the control unit 7 proceeds to step S25. Specific procedures for calculating the first and second gains will be described after the description of specific procedures for the hydrogen consumption increasing control and the hydrogen production reducing control.

In step S22, the control unit 7 changes the optimum operation points from those at the time when the normal control operation is performed to reduce the $H_2/CO$ ratio of the syngas produced by reactions in the gasification furnace 30. As used herein, the expression "syngas produced by reactions in the gasification furnace 30" refers to a part of the syngas in the gasification furnace 30, exclusive of hydrogen supplied from outside the gasification furnace 30 (namely, supplied by the hydrogen supply pump 64). In other words, the "syngas produced by reactions in the gasification furnace 30" is equivalent to syngas produced in the gasification furnace 30 when the amount of hydrogen supplied by the hydrogen supply pump 64 is zero, which differs from the "syngas discharged from the gasification furnace 30".

To reduce the $H_2/CO$ ratio of the syngas in step S22, the control unit 7 is configured to perform either of or a combination of a furnace temperature lowering operation to lower the temperature in the gasification furnace 30; and a water reducing operation to reduce the amount of water supplied into the gasification furnace 30.

Figure 8:
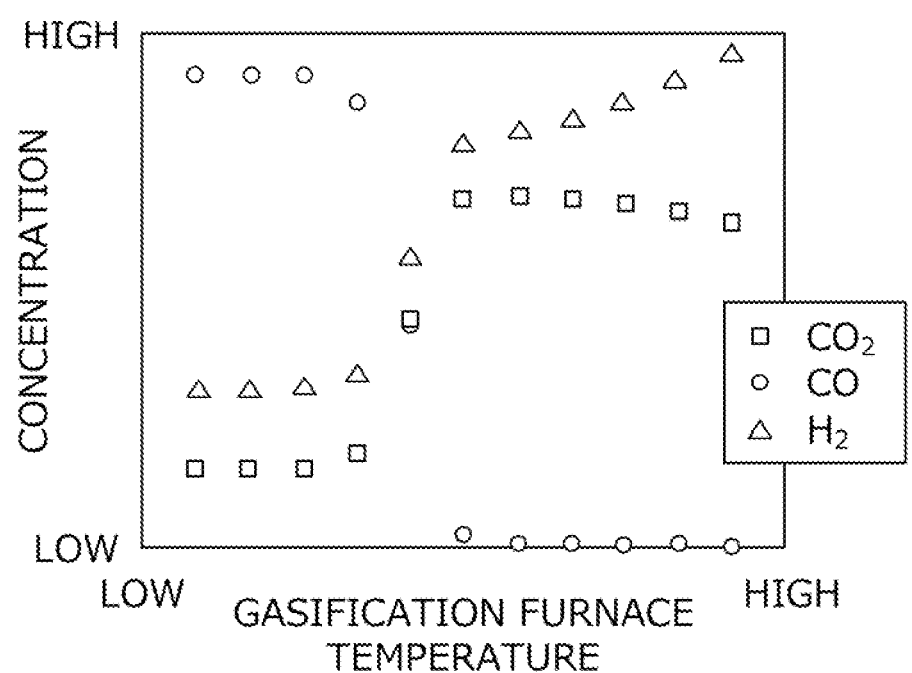
FIG. 8 is a diagram showing the relationship between the concentration of each component in the syngas produced in the gasification furnace and the temperature in the gasification furnace in a case where the amount of hydrogen supplied from outside the gasification furnace is zero.

FIG. 8 is a diagram showing the relationship between the concentration of each component in the syngas produced in the gasification furnace 30 and the temperature in the gasification furnace 30 in a case where the amount of hydrogen supplied from outside the gasification furnace 30 is zero. As shown in FIG. 8, as the temperature in the gasification furnace 30 is lowered, the content of carbon monoxide in the syngas increases, whereas the content of hydrogen and carbon dioxide in the syngas decreases. Thus, as the temperature in the gasification furnace 30 is lowered, the $H_2/CO$ ratio of the syngas produced by reactions in the gasification furnace 30 decreases. Taking advantage of this mechanism, the control unit 7 performs the furnace temperature lowering operation to reduce the amount of heat introduced by the heating unit 34, relative to the optimum operation point determined for the normal control operation, so that the temperature in the gasification furnace 30 is forced to be lowered to reduce the $H_2/CO$ ratio of the syngas produced by reactions in the gasification furnace 30.

As shown in FIG. 8, as the temperature in the gasification furnace 30 is lowered, the content of carbon dioxide in the syngas decreases. Moreover, as the amount of heat introduced by the heating unit 34 is reduced, the energy consumption of the heating unit 34 decreases, and thus the amount of carbon dioxide produced in the gasification unit 3 is successfully reduced.

As shown in formulas (1-1) to (1-5) above, as the amount of water supplied into the gasification furnace 30 is reduced, the hydrogen content of the syngas decreases. Taking advantage of this mechanism, the control unit 7 performs the water reducing operation to reduce the amount of water supplied by the water supply unit 32, relative to the optimum operation point determined for the normal control operation, so that the $H_2/CO$ ratio of the syngas produced by reactions in the gasification furnace 30 is reduced. When the amount of water supplied into the gasification furnace 30 is reduced, the amount of heat introduced by the heating unit 34 can be reduced by an amount corresponding to the latent heat of water. Therefore, the control unit 1 preferably reduces the amount of water supplied by the water supply unit 32 and reduces the amount of heat introduced by the heating unit 34 to keep the temperature in the gasification furnace 30 constant.

As shown in formulas (1-1) to (1-5) above, as the amount of water supplied into the gasification furnace 30 is reduced, the carbon dioxide content of the syngas decreases. Moreover, as the amount of heat introduced by the heating unit 34 is reduced, the energy consumption of the heating unit 34 decreases, and thus the amount of carbon dioxide produced in the gasification unit 3 is successfully reduced.

In step S22, the control unit 7 performs either of or a combination of the furnace temperature lowering operation and the water reducing operation to reduce the $H_2/CO$ ratio of the syngas produced by reactions in the gasification furnace 30. More specifically, how much carbon dioxide emission can be reduced differs between when the furnace temperature lowering operation is performed and when the water reducing operation is performed. Preferably, therefore, the control unit 7 reduces one or both of the amount of heat introduced by the heating unit 34 and the amount of water supplied by the water supply unit 32 relative to the optimum operation points determined for the normal control operation so as to minimize the amount of carbon dioxide produced in the gasification unit 3.

In step S23, the control unit 7 increases the amount of hydrogen supplied by the hydrogen supply pump 64 relative to the optimum operation point determined for the normal control operation so as to adjust, to a target ratio, the $H_2/CO$ ratio of the syngas discharged from the gasification furnace 30. When the $H_2/CO$ ratio of the syngas produced by reactions in the gasification furnace 30 is reduced in step S22, the adjustment of the $H_2/CO$ ratio of the syngas discharged from the gasification furnace 30 to a target ratio requires the amount of hydrogen supplied by the hydrogen supply pump 64 to be larger than the optimum operation point determined for the normal control operation. The control of the amount of oxygen supplied by the oxygen supply unit 33 may be basically the same as in the normal control operation, and thus will not be described in detail.

In step S24, according to the same procedure as in step S13 for the normal control operation, the control unit 7 causes the renewable power generating unit 5 to supply the power generated using renewable energy to the electrolysis unit 60, causes the electrolysis unit 60 to produce hydrogen, and causes the hydrogen charging pump 61 to charge the produced hydrogen into the hydrogen tank 62, and then ends the remaining amount reducing operation shown in FIG. 7.

As described above, the hydrogen consumption increasing control (steps S22 to S24) includes reducing the $H_2/CO$ ratio of the syngas produced by reactions in the gasification furnace 30 and increasing the amount of hydrogen supplied by the hydrogen supply pump 64, so that a syngas with the $H_2/CO$ ratio adjusted to a target ratio is produced in the gasification unit 3 while the amount of hydrogen remaining in the hydrogen tank 62 is reduced.

When the hydrogen consumption increasing control is performed as described above, the energy consumption of the heating unit 34 can be reduced. Moreover, as shown in FIG. 2, the amount of carbon dioxide emitted in the gasification furnace 30 decreases as the amount of hydrogen supplied from outside is increased, so that the efficiency of the syngas production in the gasification furnace 30 (the ratio of the amount of the syngas produced in the gasification furnace 30 to the amount of biomass feedstock introduced into the gasification furnace 30) increases. In step S21, therefore, the control unit 7 calculates the first gain by summing the gain available if the amount of heat introduced from the heating unit 34 is reduced and the gain available if the efficiency of the syngas production in the gasification furnace 30 is increased.

In step S25, according to the same procedure as in step S11 for the normal control operation, the control unit 7 calculates optimum points for operation of the gasification furnace 30 based on sensor signals from the gasification furnace sensor group 31.

In step S26, to achieve optimum operation points through the calculation, the control unit 7 controls, according to the same procedure as in step S12 for the normal control operation, the amount of water supplied by the water supply unit 32, the amount of oxygen supplied by the oxygen supply unit 33, the amount of heat introduced by the heating unit 34, and the amount of hydrogen supplied by the hydrogen supply pump 64.

In step S27, the control unit 7 causes the renewable power generating unit 5 to supply some or all of the power generated using renewable energy to the commercial power grid 8 for selling power to the power company.

In step S28, the control unit 7 reduces the amount of hydrogen produced by the electrolysis unit 60 and the amount of hydrogen charged by the hydrogen charging pump 61 by a factor corresponding to the amount of power sold to the power company.

As described above, the hydrogen production reducing control (steps S25 to S28) includes selling the power generated using renewable energy and reducing the amount of hydrogen produced by the electrolysis unit 60, so that a syngas with the $H_2/CO$ ratio adjusted to a target ratio is produced in the gasification unit 3 while the amount of hydrogen remaining in the hydrogen tank 62 is reduced. As described above, the hydrogen production reducing control makes it possible to sell the power generated using renewable energy. In step S21, therefore, the control unit 7 calculates, as the second gain, the gain available if the power generated by the renewable power generating unit 5 is sold to the power company.

Figure 9:
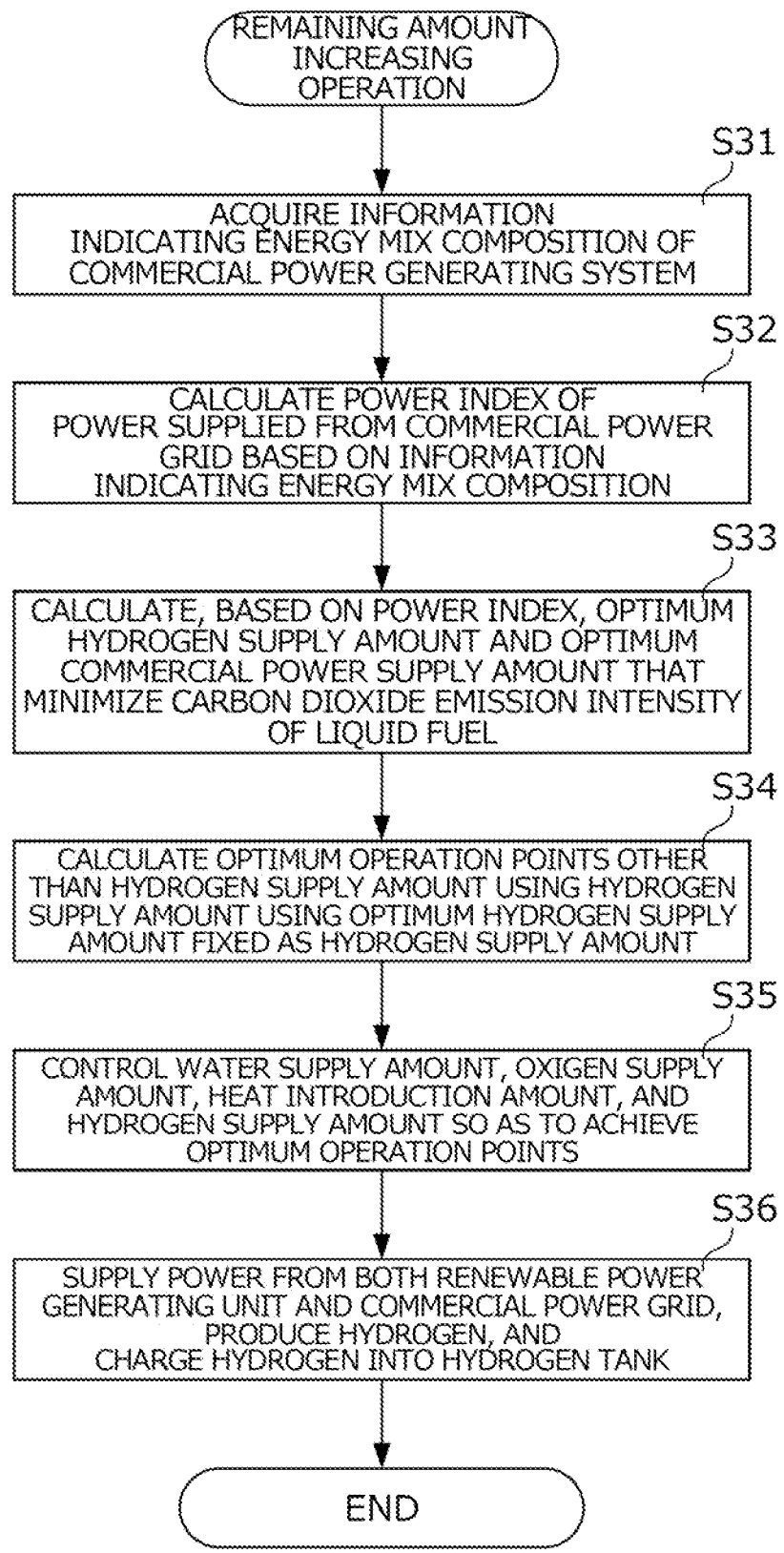
FIG. 9 is a flowchart showing a specific procedure for a remaining amount increasing operation.

FIG. 9 is a flowchart showing a specific procedure for the remaining amount increasing operation to increase the amount of hydrogen remaining in the hydrogen tank 62. As mentioned above with reference to FIG. 5, when the remaining amount of hydrogen is less than the lower threshold, the remaining amount of hydrogen needs to be increased so as not to fall below the lower hydrogen storage limit. To increase the remaining amount of hydrogen, it is necessary to increase the amount of hydrogen produced by the electrolysis unit 60. To increase the amount of hydrogen production, it is necessary to increase the amount of power supplied to the electrolysis unit 60. Thus, the remaining amount increasing operation shown in FIG. 9 includes causing power to be supplied to the electrolysis unit 60 not only from the renewable power generating unit 5 but also from the commercial power grid 8 for the production of hydrogen.

First, in step S31, the control unit 7 acquires, from the power company, information indicating the composition of the energy mix of the commercial power generating system 8a. Next, in step S32, the control unit 7 calculates a power index, which indicates the carbon dioxide emission intensity of the power currently supplied from the commercial power grid 8, based on the information indicating the composition of the energy mix. Hereinafter, an embodiment in which the carbon dioxide emission intensity itself is used as the power index will be described. It will be understood that such an embodiment is not intended to limit the present invention. The power index may be any index that increases and decreases depending on the carbon dioxide emission intensity of the power supplied from the commercial power grid 8.

Figure 10:
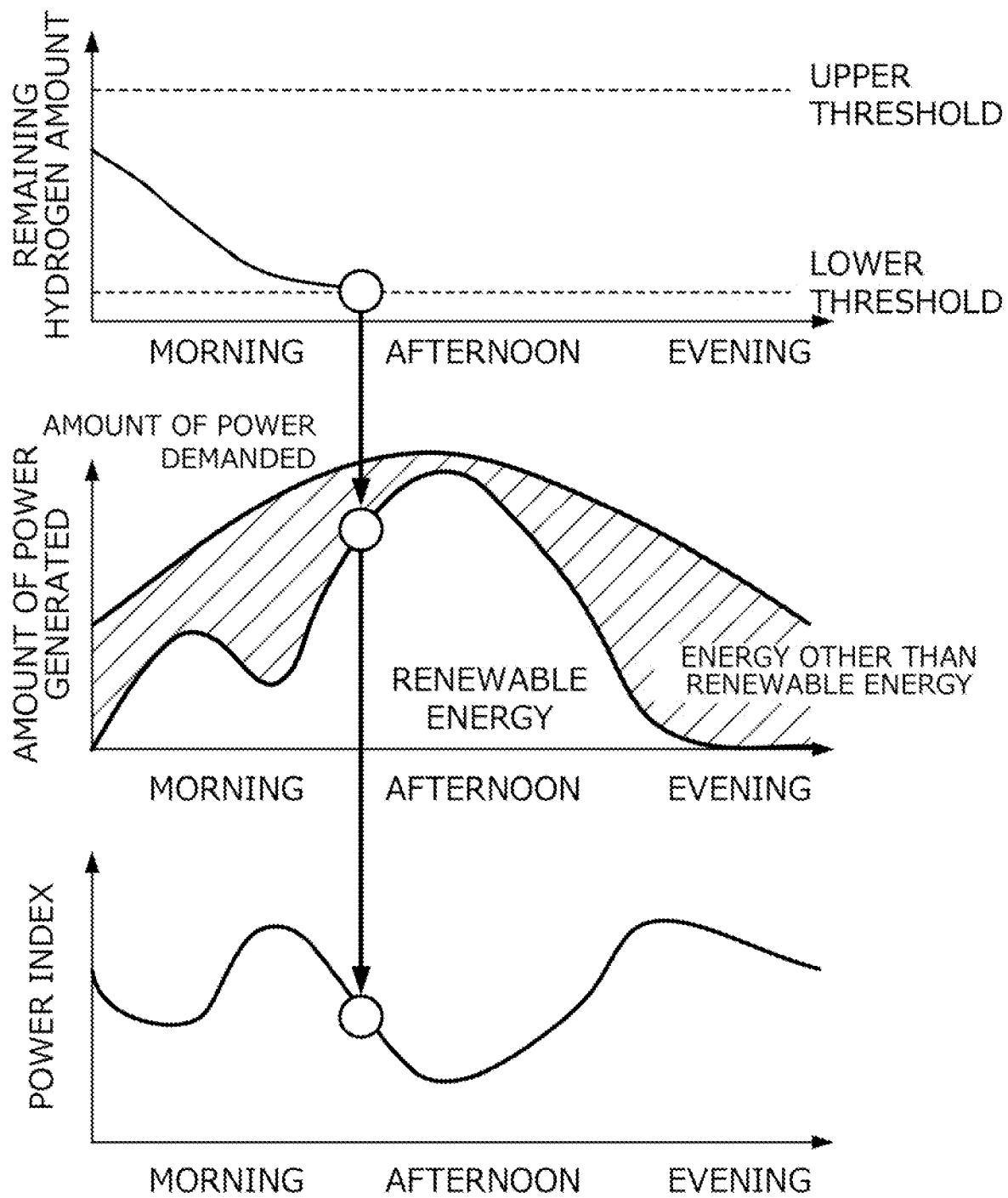
FIG. 10 is a graph showing an example of the fluctuation, over a day, of the amount of hydrogen remaining in a hydrogen tank, the amount of power generated in a commercial power generating system, and the power index of the power through a commercial power grid.

FIG. 10 is a graph showing an example of the fluctuation, over a day, of the amount of hydrogen remaining in the hydrogen tank 62, the amount of power generated through the commercial power generating system 8a, and the power index of the power through the commercial power grid 8. FIG. 10 shows a case in which the remaining amount of hydrogen falls below the lower threshold before noon, and thus the remaining amount increasing operation shown in FIG. 9 is performed.

As shown in the middle graph of FIG. 10, the amount of power generated through the commercial power generating system 8a fluctuates depending on the power demand through the commercial power grid 8. The composition of the energy mix of the commercial power generating system 8a also fluctuates over a day. As shown in FIG. 10, the energy mix of the commercial power generating system 8a is divided into two types: renewable energy and energy other than renewable energy. As shown in the lower graph of FIG. 10, the power index of the power through the commercial power grid 8 changes with changing composition of the energy mix of the commercial power generating system 8a. More specifically, the power index decreases as the ratio of renewable energy in the energy mix increases. As shown in FIG. 10, therefore, the power index calculated in step S32 changes at the time when the remaining amount of hydrogen falls below the lower threshold.

Referring back to FIG. 9, in step S33, the control unit 7 causes the electrolysis unit 60 to supply, to the gasification unit 3, the hydrogen produced using the power supplied from the commercial power grid 8, and calculates the amounts of hydrogen supply and commercial power supply that minimize the carbon dioxide emission intensity of the liquid fuel per unit of liquid fuel produced by the liquid fuel production unit 4 (hereinafter, such amounts of hydrogen supply and commercial power supply will be referred to as "optimum amount of hydrogen supply"and "optimum amount of power supply", respectively). Hereinafter, a procedure for calculating the optimum amount of hydrogen supply and the optimum amount of power supply, which minimize the carbon dioxide emission intensity of the liquid fuel, will be described.

First, the gasification unit 3 and the commercial power generating system 8a are assigned as main carbon dioxide emission sources in the process of producing the liquid fuel using the liquid fuel production unit 4 and the gasification unit 3 to which hydrogen produced using the power supplied from the commercial power grid 8 is supplied. Therefore, per unit of liquid fuel produced using the liquid fuel production unit 4 and the gasification unit 3 to which hydrogen produced by the electrolysis unit 60 using the power supplied from the commercial power grid 8 is supplied, the carbon dioxide emission intensity of the liquid fuel is approximately proportional to the sum of the amount of carbon dioxide emitted from the gasification unit 3 (hereinafter, referred to as "the amount of $CO_2$ emission during synthesis") and the amount of carbon dioxide emitted from the commercial power generating system 8a (hereinafter, referred to as "the amount of $CO_2$ emission during hydrogen production"), which supplies the power to the commercial power grid 8.

Figure 11:
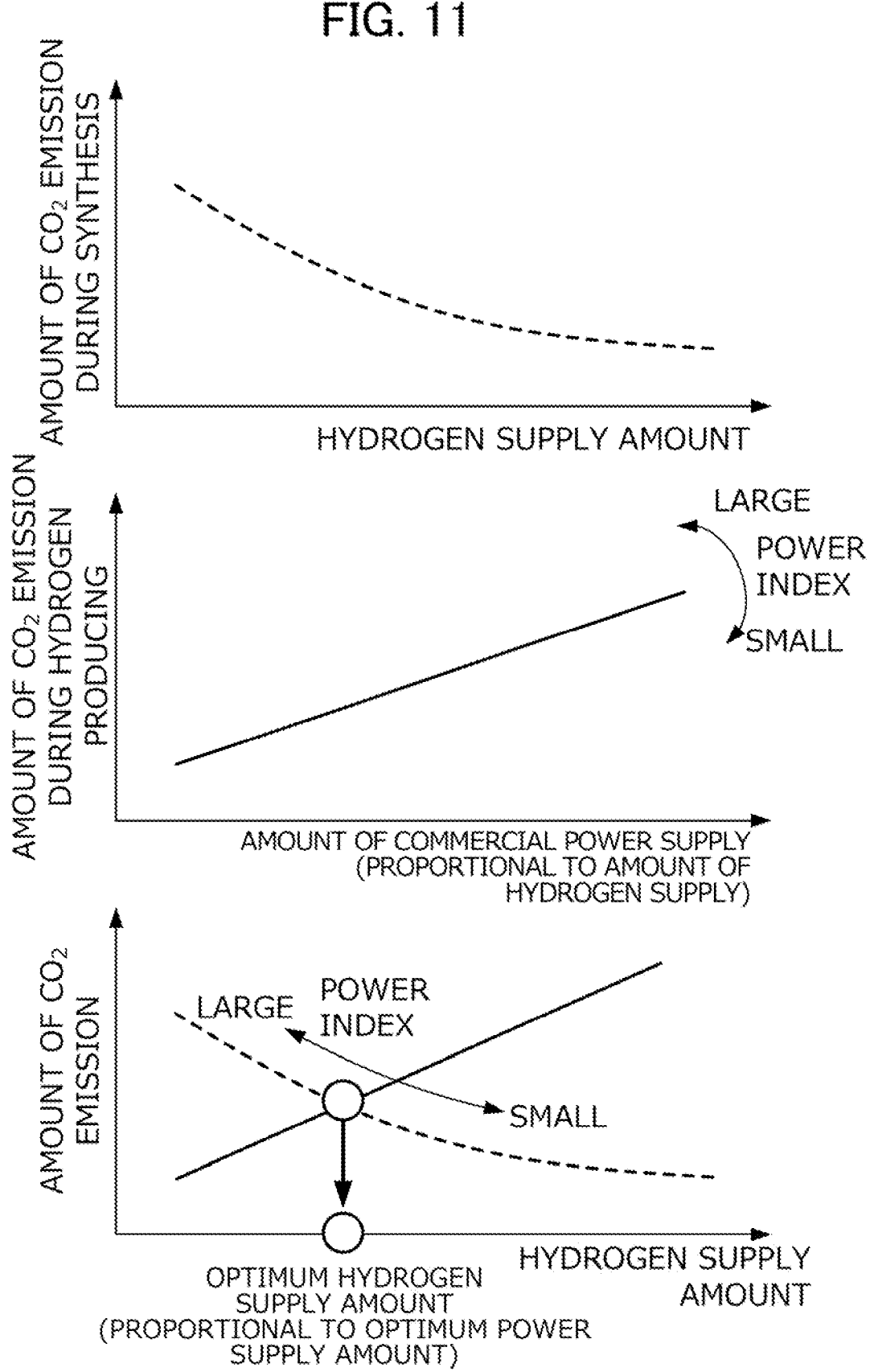
FIG. 11 is a graph showing changes in the amount of $CO_2$ emission during synthesis and in the amount of $CO_2$ emission during hydrogen production upon changes in the amount of hydrogen supply and the amount of commercial power supply.

FIG. 11 is a graph showing changes in the amount of $CO_2$ emission during synthesis and in the amount of $CO_2$ emission during hydrogen production upon changes in the amount of hydrogen supply and the amount of commercial power supply. The upper graph of FIG. 11 shows the relationship between the amount of $CO_2$ emission during synthesis and the amount of hydrogen supply. The middle graph of FIG. 11 shows the relationship between the amount of $CO_2$ emission during hydrogen production and the amount of commercial power supply.

As shown in the upper graph of FIG. 11, the amount of $CO_2$ emission during synthesis decreases with increasing amount of hydrogen supply and increases with decreasing amount of hydrogen supply. As shown in the middle graph of FIG. 11, the amount of $CO_2$ emission during hydrogen production increases with increasing amount of commercial power supply and decreases with decreasing amount of commercial power supply. The slope of the amount of $CO_2$ emission during hydrogen production increases with increasing power index and decreases with decreasing power index.

Assume, for the sake of explanation, that the entire amount of hydrogen produced by the electrolysis unit 60 using the power supplied from the commercial power grid 8 is supplied to the gasification unit 3. In other words, assume that the amount of hydrogen supply is equal to the amount of hydrogen produced using the power from the commercial power grid 8. Under this assumption, the amount of commercial power supply is proportional to the amount of hydrogen supply. As shown in the lower graph of FIG. 11, therefore, the amount of $CO_2$ emission during synthesis and the amount of $CO_2$ emission during hydrogen production can be both expressed as a function of the amount of hydrogen supply.

As shown in the lower graph of FIG. 11, the amount of $CO_2$ emission during synthesis decreases with increasing amount of hydrogen supply, whereas the amount of $CO_2$ emission during hydrogen production increases with increasing amount of hydrogen supply. On the other hand, the amount of $CO_2$ emission during synthesis increases with decreasing amount of hydrogen supply, whereas the amount of $CO_2$ emission during hydrogen production decreases with decreasing amount of hydrogen supply. Therefore, when the sum of the amount of $CO_2$ emission during synthesis and the amount of $CO_2$ emission during hydrogen production is expressed as a function of the amount of hydrogen supply, the optimum amount of hydrogen supply can be calculated as a solution to what is the minimum of the sum. As mentioned above, the slope of the amount of $CO_2$ emission during hydrogen production changes depending on the power index. More specifically, the optimum amount of hydrogen supply decreases with increasing power index and increases with decreasing power index. Therefore, the optimum amount of hydrogen supply can be expressed as a function of the power index.

The control unit 7 stores a map that associates the optimum amount of hydrogen supply with the power index. In step S33, the control unit 7 calculates the optimum amount of hydrogen supply by retrieving data from the map based on the power index calculated in step S32. The control unit 7 also calculates the optimum amount of power supply by multiplying the optimum amount of hydrogen supply by a predetermined factor to convert the amount into electric power. According to the procedure described above, the control unit 7 calculates, based on the power index, the optimum amount of hydrogen supply and the optimum amount of power supply, which minimize the carbon dioxide emission intensity of the liquid fuel.

In step S34, the control unit 7 calculates optimum operation points (the amount of water supplied by the water supply unit 32, the amount of oxygen supplied by the oxygen supply unit 33, and the amount of heat introduced by the heating unit 34), other than the amount of hydrogen supply, using the optimum amount of hydrogen supply, which is determined in step S33, fixed as the amount of hydrogen supplied by the hydrogen supply pump 64.

In step S35, the control unit 7 controls the amount of water supplied by the water supply unit 32, the amount of oxygen supplied by the oxygen supply unit 33, the amount of heat introduced by the heating unit 34, and the amount of hydrogen supplied by the hydrogen supply pump 64 so as to achieve the optimum operation points calculated in steps S33 and S34.

In step S36, the control unit 7 causes both the renewable power generating unit 5 and the commercial power grid 8 to supply the power to the electrolysis unit 60, causes the electrolysis unit 60 to produce hydrogen, and causes the hydrogen charging pump 61 to charge the produced hydrogen into the hydrogen tank 62, and then ends the remaining amount increasing operation shown in FIG. 9. The control unit 7 controls the amount of commercial power supply from the commercial power grid 8 to the electrolysis unit 60 so as to achieve the optimum amount of power supply determined in step S33. As described above, the control unit 7 calculates the optimum amount of power supply by converting the optimum amount of hydrogen supply into electric power. As a result, the amount of hydrogen remaining in the hydrogen tank 62 increases by an amount corresponding to the power supplied from the renewable power generating unit 5 to the electrolysis unit 60.

The fuel production system 1 according to this embodiment brings about advantageous effects as follows.

(1) The fuel production system 1 includes the gasification unit 3 that gasifies biomass feedstock to produce a syngas; the liquid fuel production unit 4 that produces a liquid fuel from the syngas; the electrolysis unit 60 that produces hydrogen using electric power; the hydrogen tank 62 that stores the hydrogen produced by the electrolysis unit 60; and the hydrogen supply pump 64 that supplies the hydrogen from the hydrogen tank 62 to the gasification unit 3. In the fuel production system 1, the electrolysis unit 60 is connected to two electric power sources including the renewable power generating unit 5 that supplies electric power generated using renewable energy and the commercial power grid 8 that supplies electric power with a carbon dioxide emission intensity higher than that of the electric power from the renewable power generating unit 5. When the amount of hydrogen remaining in the hydrogen tank 62 is smaller than the lower threshold, the control unit 7 causes electric power to be supplied to the electrolysis unit 60 not only from the renewable power generating unit 5 using renewable energy but also from the commercial power grid 8. This allows the electrolysis unit 60 to produce as much hydrogen as necessary for the gasification unit 3. The control unit 7 also acquires the power index that increases and decreases depending on the carbon dioxide emission intensity of the power supplied from the commercial power grid 8. When the amount of hydrogen remaining in the hydrogen tank 62 is smaller than the lower threshold, the control unit 7 controls, based on the power index, the amount of hydrogen supplied by the hydrogen supply pump 64 and the amount of commercial power supply from the commercial power grid 8 to the electrolysis unit 60. This makes possible continuous production of the liquid fuel with no significant increase in the carbon dioxide emission intensity of the liquid fuel even when the amount of hydrogen remaining in the hydrogen tank 62 is smaller than the lower threshold.

(2) The higher the power index, the larger the amount of carbon dioxide emitted from the commercial power generating system 8a that supplies electric power to the commercial power grid 8, per unit of hydrogen produced by the electrolysis unit 60 using electric power supplied from the commercial power grid 8. To address this, the control unit 7 reduces the amount of hydrogen supply and the amount of commercial power supply as the power index increases, and increases the amount of hydrogen supply and the amount of commercial power supply as the power index decreases. This makes possible continuous production of the liquid fuel with no significant increase in the carbon dioxide emission intensity of the liquid fuel.

(3) The liquid fuel is produced using the gasification unit 3 and the liquid fuel production unit 4 while the hydrogen produced using electric power supplied from the commercial power grid 8 is supplied to the gasification unit 3. In this process, the gasification unit 3 and the commercial power generating system 8a that supplies electric power to the commercial power grid 8 are assigned as main carbon dioxide emission sources. The amount of carbon dioxide emitted in the gasification unit 3 correlates with the amount of hydrogen supplied to the gasification unit 3. Therefore, the carbon dioxide emission intensity of the liquid fuel correlates with the amount of hydrogen supply and the amount of commercial power supply. Based on the correlation, the control unit 7 controls the amount of hydrogen supply and the amount of commercial power supply so as to minimize the carbon dioxide emission intensity of the liquid fuel. This makes possible continuous production of the liquid fuel with no significant increase in the carbon dioxide emission intensity of the liquid fuel, even when the remaining amount of hydrogen is smaller than the lower threshold.

(4) The control unit 7 causes the electrolysis unit 60 to supply, to the gasification unit 3, the hydrogen produced using the electric power supplied from the commercial power grid 8 and controls the amount of hydrogen supply and the amount of commercial power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit 3 per unit of liquid fuel produced by the liquid fuel production unit 4, and the amount of $CO_2$ emission during hydrogen production corresponds to the amount of carbon dioxide emitted from the commercial power generating system 8a that supplies electric power to the commercial power grid 8, per unit of liquid fuel produced by the liquid fuel production unit 4. This feature makes possible continuous production of the liquid fuel with no significant increase in the carbon dioxide emission intensity of the liquid fuel, even when the remaining amount of hydrogen is smaller than the lower threshold.

(5) The control unit 7 acquires information indicating the composition of the energy mix of the commercial power generating system 8a that supplies electric power to the commercial power grid 8 and calculates the power index based on the information indicating the composition of the energy mix. This allows precise calculation of the power index based on the composition of the energy mix of the commercial power generating system 8a, which changes with time.

It will be understood that embodiments of the present invention described above are not intended to limit the present invention. Details of the embodiments may also be changed or modified as appropriate within the scope of the gist of the present invention.

What is claimed is:
1. A fuel production system for producing a liquid fuel from biomass feedstock, comprising:

a gasification unit comprising a gasification furnace that gasifies biomass feedstock to produce a syngas comprising hydrogen and carbon monoxide;
a liquid fuel production unit that produces a liquid fuel from the syngas produced by the gasification unit;
an electrolysis unit that is connected to a first electric power source that supplies electric power generated using renewable energy and connected to a second electric power source that supplies electric power with a carbon dioxide emission intensity higher than that of the electric power from the first electric power source and produces hydrogen from water using electric power;
a hydrogen tank that stores the hydrogen produced by the electrolyte unit;
a remaining hydrogen amount determining section that determines an amount of hydrogen remaining in the hydrogen tank;
a hydrogen supply unit that supplies the hydrogen from the hydrogen tank to the gasification unit;
a power index determining section that determines a power index that increases and decreases depending on the carbon dioxide emission intensity of the electric power supplied from the second electric power source; and
a control unit, wherein when the remaining amount of hydrogen is smaller than a predetermined amount, the control unit causes the electric power to be supplied from the first and second electric power sources to the electrolysis unit for production of hydrogen and controls, based on the power index, the amount of hydrogen supplied by the hydrogen supply unit and the amount of second electric power supplied from the second electric power source to the electrolysis unit.

2. The fuel production system according to claim 1, wherein the control unit reduces the amount of hydrogen supply and the amount of second electric power supply as the power index increases, and increases the amount of hydrogen supply and the amount of second electric power supply as the power index decreases.

3. The fuel production system according to claim 1, wherein the control unit controls the amount of hydrogen supply and the amount of second electric power supply such that the liquid fuel produced by the liquid fuel production unit has a minimum carbon dioxide emission intensity.

4. The fuel production system according to claim 2, wherein the control unit controls the amount of hydrogen supply and the amount of second electric power supply such that the liquid fuel produced by the liquid fuel production unit has a minimum carbon dioxide emission intensity.

5. The fuel production system according to claim 1, wherein the control unit causes the electrolysis unit to supply, to the gasification unit, hydrogen produced using the electric power supplied from the second electric power source and controls the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from a power generating system that supplies electric power to the second electric power source, per unit of liquid fuel produced by the liquid fuel production unit.

6. The fuel production system according to claim 2, wherein the control unit causes the electrolysis unit to supply, to the gasification unit, hydrogen produced using the electric power supplied from the second electric power source and controls the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from a power generating system that supplies electric power to the second electric power source, per unit of liquid fuel produced by the liquid fuel production unit.

7. The fuel production system according to claim 3, wherein the control unit causes the electrolysis unit to supply, to the gasification unit, hydrogen produced using the electric power supplied from the second electric power source and controls the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from a power generating system that supplies electric power to the second electric power source, per unit of liquid fuel produced by the liquid fuel production unit.

8. The fuel production system according to claim 4, wherein the control unit causes the electrolysis unit to supply, to the gasification unit, hydrogen produced using the electric power supplied from the second electric power source and controls the amount of hydrogen supply and the amount of second electric power supply so as to minimize the sum of the amount of $CO_2$ emission during synthesis and the amount of $CO_2$ emission during hydrogen production, wherein the amount of $CO_2$ emission during synthesis corresponds to the amount of carbon dioxide emitted from the gasification unit per unit of liquid fuel produced by the liquid fuel production unit, and the amount of $CO_2$ emission during hydrogen production corresponds to the amount of carbon dioxide emitted from a power generating system that supplies electric power to the second electric power source, per unit of liquid fuel produced by the liquid fuel production unit.

9. The fuel production system according to claim 5, wherein the power index determining section acquires information indicating the composition of energy mix of the power generating system and calculates the power index based on the information indicating the composition of energy mix.

10. The fuel production system according to claim 6, wherein the power index determining section acquires information indicating the composition of energy mix of the power generating system and calculates the power index based on the information indicating the composition of energy mix.

11. The fuel production system according to claim 7, wherein the power index determining section acquires information indicating the composition of energy mix of the power generating system and calculates the power index based on the information indicating the composition of energy mix.

12. The fuel production system according to claim 8, wherein the power index determining section acquires information indicating the composition of energy mix of the power generating system and calculates the power index based on the information indicating the composition of energy mix.

* * * * *